US012736396B2

(12) United States Patent
Alker

(10) Patent No.: US 12,736,396 B2
(45) Date of Patent: Sep. 15, 2026

(54) PREDICTION OF FAR-FIELD RADIATED ACOUSTIC FIELDS IN A FLUID USING NEAR-FIELD ACOUSTIC MEASUREMENTS

(71) Applicant: SMTA Limited, Surrey (GB)

(72) Inventor: Graham Alker, Surrey (GB)

(73) Assignee: SMTA Limited, Surrey (GB)

( * ) Notice: Subject to any disclaimer, the term of this patent is extended or adjusted under 35 U.S.C. 154(b) by 358 days.

(21) Appl. No.: 18/563,573

(22) PCT Filed: May 24, 2022

(86) PCT No.: PCT/EP2022/064103
§ 371 (c)(1),
(2) Date: Nov. 22, 2023

(87) PCT Pub. No.: WO2022/248497
PCT Pub. Date: Dec. 1, 2022

(65) Prior Publication Data

US 2024/0219223 A1 Jul. 4, 2024

(30) Foreign Application Priority Data

May 25, 2021 (GB) ..................................... 2107416

(51) Int. Cl.
*G01H 3/12* (2006.01)
*G01V 1/38* (2006.01)

(52) U.S. Cl.
CPC ........... *G01H 3/125* (2013.01); *G01V 1/3808* (2013.01); *G01V 1/3817* (2013.01)

(58) Field of Classification Search
CPC ............ G01H 1/00; G01H 1/003; G01H 3/00; G01H 13/00; G01H 15/00; G01H 11/08;
(Continued)

(56) References Cited

U.S. PATENT DOCUMENTS 4,183,009 A * 1/1980 Carlson .................. H04B 11/00 181/402
4,281,551 A 8/1981 Gaudriot et al.
(Continued)

FOREIGN PATENT DOCUMENTS

EP 3777234 B1 * 3/2022 ........... G10K 11/346
GB 2328017 A * 2/1999 ........... G01V 1/3808
(Continued)

OTHER PUBLICATIONS

Mb Salin, et al, "Nearfield acoustic holography-based methods for far field prediction", Applied Acoustics (Elsevier Publishing, GB), vol. 159, Nov. 5, 2019, pp. 1-8.
(Continued)

*Primary Examiner* — Andre J Allen
(74) *Attorney, Agent, or Firm* — Young Basile Hanlon & MacFarlane, P.C.

(57) ABSTRACT

A method of predicting a far-field radiated acoustic field of an object in a fluid is provided. The method includes providing an array of acoustic sensors, wherein the array is a linear array, positioning the array in the fluid proximate to the object, radiating into the fluid, by the object, one or more acoustic signals, measuring, by the acoustic sensors, the acoustic signals, and predicting, by one or more processors, the far-field radiated acoustic field of the object using the measurements of the acoustic signals. The positioning of the array includes orienting the array in a direction that is substantially parallel to a longitudinal axis of the object and positioning the array in a near-field region of the object.

20 Claims, 9 Drawing Sheets

(58) Field of Classification Search

CPC ........ G01H 17/00; G01H 11/00; G01H 9/004; G01H 1/08; G01H 1/12; G01H 11/06; G01H 3/005; G01H 9/00; G01H 3/08; G01H 3/14; G01H 1/14; G01H 1/16; G01H 3/04; G01H 5/00; G01H 9/002; G01H 3/06; G01H 3/10; G01H 3/125; G01H 9/006; G01N 29/11; G01N 29/045; G01N 29/12; G01N 2291/106; G01N 29/04; G01N 2291/02854; G01N 29/14; G01N 2291/02827; G01N 29/022; G01N 2291/044; G01N 29/348; G01N 29/46; G01N 29/07; G01N 29/043; G01N 29/42; G01N 29/225; G01N 2291/0258; G01N 2291/02836; G01N 29/2462; G01N 29/265; G01N 29/222; G01N 29/28; G01N 2291/015; G01N 2291/0231; G01N 2291/02416; G01N 2291/0423; G01N 29/223; G01N 29/2418; G01N 2291/0232; G01N 2291/101; G01N 29/032; G01N 29/036; G01N 29/2437; G01N 29/343; G01N 33/383; G01N 2291/011; G01N 29/041; G01N 29/228; G01N 29/30; G01N 29/2412; G01N 29/262; G01N 29/38; G01N 2291/014; G01N 2291/0238; G01N 2291/02872; G01N 2291/2636; G01N 29/221; G01N 2203/0051; G01N 2291/012; G01N 2291/02466; G01N 29/024; G01N 29/4427; G01N 2291/0235; G01N 2291/0237; G01N 2291/0255; G01N 2291/0289; G01N 2291/0421; G01N 2291/0427; G01N 29/0609; G01N 29/22; G01N 29/40; G01N 3/32; G01N 2203/0073; G01N 2203/0688; G01N 2291/02881; G01N 2291/269; G01N 29/2475; G01N 29/4436; G01N 29/4454; G01N 21/1702; G01N 2291/0222; G01N 2291/0256; G01N 2291/02818; G01N 2291/0425; G01N 2291/102; G01N 2291/2634; G01N 2291/2693; G01N 2291/2694; G01N 29/02; G01N 29/0672; G01N 29/09; G01N 29/24; G01N 29/2493; G01N 29/27; G01N 29/32; G01N 29/4418; G01N 29/4463; G01N 3/30; G01N 33/46; G01N 19/04; G01N 2203/0055; G01N 2291/0422; G01N 2291/048; G01N 2291/105; G01N 2291/2623; G01N 2291/2626; G01N 2291/2632; G01N 25/72; G01N 29/069; G01N 29/227; G01N 29/2481; G01N 29/34; G01N 29/36; G01N 29/44; G01N 19/08; G01N 2021/1704; G01N 2291/021; G01N 2291/022; G01N 2291/02408; G01N 2291/0426; G01N 2291/103; G01N 2291/263; G01N 2291/2698; G01N 29/245; G01N 29/26; G01N 29/326; G01N 29/345; G01N 3/38; G01N 33/02; G01N 9/002; G01N 1/20; G01N 11/16; G01N 15/0227; G01N 2015/025; G01N 2015/0294; G01N 2015/1497; G01N 2021/1706; G01N 2021/845; G01N 2021/8592; G01N 21/3504; G01N 21/85; G01N 2203/0286; G01N 2203/0658; G01N 2291/023; G01N 2291/02491; G01N 2291/0257; G01N 2291/02809; G01N 2291/056; G01N 2291/104; G01N 2291/2638; G01N 2291/2696; G01N 2291/2697; G01N 27/90; G01N 29/06; G01N 29/075; G01N 29/226; G01N 29/2456; G01N 29/4472; G01N 29/48; G01N 29/50; G01N 33/0098; G01N 1/00; G01N 11/00; G01N 15/1433; G01N 2035/00554; G01N 21/39; G01N 21/65; G01N 2203/0039; G01N 2203/0062; G01N 2203/0089; G01N 2203/0222; G01N 2203/0623; G01N 2203/0676; G01N 2291/018; G01N 2291/024; G01N 2291/02441; G01N 2291/02483; G01N 2291/0252; G01N 2291/057; G01N 2291/267; G01N 2291/2675; G01N 2291/2695; G01N 23/083; G01N 25/00; G01N 27/20; G01N 27/26; G01N 27/308; G01N 27/38; G01N 27/60; G01N 27/9013; G01N 27/904; G01N 29/046; G01N 29/0663; G01N 29/2443; G01N 29/2487; G01N 29/4445; G01N 29/449; G01N 29/52; G01N 3/00; G01N 3/34; G01N 3/48; G01N 3/62; G01N 33/004; G01N 33/025; G01N 33/241; G01N 33/343; G01N 33/367; G01N 33/445; G01N 33/53; G01N 33/54313; G01N 33/585; G01N 35/025; G01N 35/1016; G01N 37/00; G01N 15/08; G01N 2009/006; G01N 2015/084; G01N 2015/0846; G01N 2021/8845; G01N 21/3103; G01N 21/3581; G01N 21/645; G01N 21/84; G01N 21/55; G01N 21/95; G01N 22/02; G01N 2203/0092; G01N 2291/02845; G01N 23/20; G01N 23/22; G01N 25/60; G01N 27/82; G01N 29/0618; G01N 29/0645; G01N 29/0654; G01N 29/2431; G01N 29/2468; G01N 29/346; G01N 29/4481; G01N 31/223; G01N 33/00; G01N 33/2045; G01N 9/24; G01V 1/001; G01V 1/133; G01V 11/00; G01V 13/00; G01V 3/08; G01V 1/16; G01V 1/3808; G01V 1/181; G01V 1/201; G01V 1/28; G01V 1/34; G01V 1/36; G01V 1/38; G01V 1/3861; G01V 1/44; G01V 1/50; G01V 2210/123; G01V 2210/3246; G01V 3/00; G01V 3/081; G01V 5/00; G01V 8/00; G01V 8/02; G01V 9/005; G01V 9/007; G01V 1/00; G01V 1/01; G01V 1/04; G01V 1/143; G01V 1/162; G01V 1/166; G01V 1/20; G01V 1/223; G01V 1/24; G01V 1/247; G01V 1/3852; G01V 5/107; G01V 8/24

USPC ........................................................... 73/584

See application file for complete search history.

(56) References Cited

U.S. PATENT DOCUMENTS 5,493,540 A 2/1996 Straus et al.
5,504,714 A * 4/1996 Shonting ................ G01V 1/001 367/13
10,317,543 B2 * 6/2019 Tabti ...................... G01V 1/006

(56) References Cited

U.S. PATENT DOCUMENTS

| | | | | |
|---|---|---|---|---|
| 10,495,770 | B2 * | 12/2019 | Lima | G01V 1/006 |
| 10,627,540 | B2 * | 4/2020 | Tenghamn | G01V 1/38 |

FOREIGN PATENT DOCUMENTS

| | | | | | |
|---|---|---|---|---|---|
| GB | 2441344 | A | * | 3/2008 | G01V 1/364 |
| GB | 2468912 | A | * | 9/2010 | G01V 1/38 |
| WO | WO-2013137974 | A1 | * | 9/2013 | G01V 1/38 |
| WO | WO-2018026513 | A1 | * | 2/2018 | G01V 1/38 |

OTHER PUBLICATIONS

Andrew M Patterson, et al, "Evaluation of Underwater Noise from Vessels and Marine Activities", 2013 IEEE/OES Acoustics In Underwater Geosciences Symposium (IEEE), Jul. 24, 2013, 9 pgs.

Tian He, et al, "Analysis on accuracy improvement of rotor-stator rubbing localization based on acoustic emission beamforming me", Ultrasonics, vol. 54, No. 1, May 3, 2013, pp. 318-329.

Frederick Roberts Crawford, "Submarine radiated noise far-field beam patterns for discrete frequencies from near-field measurements", Calhoun Institutional Archive of the Naval Postgraduate School, Dec. 1975, Retrieved from the Internet: URL: https://citeseerx.ist.psu.edu/viewdoc/download?doi=10.1.1.1033.9208&rep=replétype=pdf [retrieved on Jan. 25, 2022], 102 pgs.

* cited by examiner

PREDICTION OF FAR-FIELD RADIATED ACOUSTIC FIELDS IN A FLUID USING NEAR-FIELD ACOUSTIC MEASUREMENTS

TECHNICAL FIELD

The present invention relates to the prediction of far-field radiated acoustic fields in a fluid, such as water, of a platform, using near-field acoustic measurements.

BACKGROUND

Fields, for example acoustic fields or electromagnetic fields, radiated by an object, e.g., a transmitter or an array of transmitters, are typically described as having a "far-field" and a "near-field".

In many applications, the "near-field" of a transmitter is defined as being less than or equal to the Fraunhofer distance from that transmitter. The Fraunhofer distance of a transmitter is $2D^2/\lambda$ where D is the largest dimension, longitude, or diameter of the transmitter, and $\lambda$ is the wavelength of the signals produced by that transmitter.

Typically, spatial characteristics of the far-field of a transmitter are relatively simple with relatively simple spatial variation. In contrast, the near-field of a transmitter tends to be relatively highly disturbed.

It is often desirable to measure far-field characteristics of devices or objects. For example, it is desirable to be able to accurately assess the far-field acoustic radiation of watercraft, such as dived submarines.

SUMMARY

The present invention tends to provide for prediction of the far-field radiated noise of a dived submarine, for example a completely submerged submarine that may be at a depth of about, but not limited to, 100 m, which may be predicted using acoustic measurements taken while that submarine is surfaced, i.e., where at least a portion of the submarine extends above a surface of the water. The present invention relates to the part of the radiated noise that is driven by on-board machinery as opposed to noise generated by the movement of the platform through the fluid. The measurements of the surfaced submarine may be taken while the submarine is proximate a harbour wall or berth structure, e.g., within about 3 metres (m) of said structure. This is in contrast to existing methods that use far-field and/or near-field acoustic measurements taken while the submarine is at depth and away from the sea surface, e.g., at depths of greater than 100 m.

The current practice of ranging a deep submarine using deep acoustic sensors tends to suffer significantly from the presence of the sea surface. Typically, in addition to the direct path, noise reflects on the water surface. Thus there are two paths by which the noise arrives at the measurement sensor. The noises from these paths interfere, sometimes constructively, sometimes destructively. Clearly, if noise ranges with both submarine and acoustic sensors at depth, say of about 100 m, are compromised by the presence of the sea surface, it is not surprising that measurements of a surfaced submarine made with acoustic sensors at depth of, for example, 10 m or less, such as between 4 m and 6 m depth, have not been considered for use in predicting a deep submarine's radiated noise.

However, the present inventors have realised that the far-field can be calculated from these near surface measurements.

There is an accepted method for predicting or reconstructing the far-field acoustic signature of an object from acoustic measurements taken in the near-field of that object based on the Kirchhoff-Helmholtz integral equation. In this method, the object may be completely enveloped by sensors that measure both sound pressure and the particle velocity of the water normal to the surrounding envelope. In some cases of the envelope shape, such as a sphere, an infinite cylinder, or an infinite flat plane, the method may be performed using only pressure measurements.

For conventional methods of assessing the radiated noise field of a submarine at depth, it tends to be preferable that the submarine be dived (i.e., completely submerged) at a significant depth below the water surface. It also tends to be preferable to locate measurement sensors as far from the submarine as possible. Furthermore, conventional methods tend not to be accurate, for example because of the interference of the direct sound path to the measuring sensors by the water surface and the difficulties of determining the propagation loss of the signal between the submarine and the measurement sensors. It tends to be preferable that the submarine be far from the interference of any reflecting surfaces or objects. Such surfaces or objects may include, but are not limited to, walls of docks or harbours, and the surface and floor of the body of water in which the submarine resides.

Aspects of the invention provide a method of assessing the far-field radiated noise of an object, for example a submarine (which may be a dived submarine).

The present invention tends to provide for prediction of the far-field radiated noise of a dived submarine, for example a completely submerged submarine that may be at a depth of about (but not limited to) 100 m or greater, which may be predicted using acoustic measurements taken while that submarine is surfaced, i.e., where at least a portion of the submarine extends above a surface of the water. The measurements of the surfaced submarine may be taken while the submarine is proximate a harbour wall or berth structure, e.g., within about 10 m of said structure. This is in contrast to existing methods that use far-field and/or near-field acoustic measurements taken while the submarine is at depth and away from the sea surface, e.g., at depths of greater than 100 m.

In a first aspect, the present invention provides a method of predicting a far-field radiated acoustic field of an object in a fluid. The method includes providing a linear array of acoustic sensors, positioning the array of acoustic sensors in the fluid proximate to the object, radiating into the fluid, by the object, one or more acoustic signals, measuring, by the acoustic sensors, the acoustic signals, and predicting, by one or more processors operatively coupled to the array of acoustic sensors, the far-field radiated acoustic field of the object using the measurements of the acoustic signals. The positioning of the array of acoustic sensors includes orienting the array in a direction that is substantially parallel to a longitudinal axis of the object and positioning the array in a near-field region of the object. The near-field region of the object is a region that is less than or equal to a distance of $2D^2/\lambda$ from the object, where D is a length of the object or a part thereof along the longitudinal axis of the object and $\lambda$ is a wavelength of the one or more of the acoustic signals transmitted by the object.

The fluid may be water.

The object may be a watercraft.

The positioning of the array of acoustic sensors in the fluid may include submerging the array in the water.

The positioning of the array of acoustic sensors may include deploying the array of acoustic sensors from the watercraft.

The object may be a submarine. The submarine may be surfaced.

The array of acoustic sensors may be a uniform linear array of acoustic sensors.

A spacing between pairs of adjacent acoustic sensors in the array may be less than or equal to $\lambda/2$.

The method may further include fixing the array of acoustic sensors to a support structure. The support structure may be a support structure selected from the group of support structures consisting of a support structure that is at least partially submerged in the water, a support structure that is remote from the water, a buoyant support structure floating on the water, a harbour wall, a dock wall, a wall of a shipyard, a wall of a submarine pen, a jetty, an oil rig, a watercraft, scaffolding, a pontoon, a raft, a buoy.

The array of acoustic sensors may include couplings attaching together pairs of adjacent acoustic sensors. The couplings may be flexible thereby to allow for the winding of the array onto a reel. Alternatively, the couplings may be rigid. The rigid couplings may comprise one or more hinges thereby to allow folding of the array, e.g., for storage on and/or deployment from the watercraft or submarine.

The positioning of the array may include positioning the array at a same depth beneath a surface of the water as at least a part of the object.

The predicting of the far-field radiated acoustic field may include calculating the Kirchhoff-Helmholtz integral multiplied by a multiplicative scaling factor.

The method may further include identifying a frequency of interest in the predicted of the far-field radiated acoustic field, and, using the array of acoustic sensors, determining a location on the object of a source of a signal having the frequency of interest. Determining the location may include performing near-field beam steering using the array of acoustic sensors. The frequency of interest may be associated with a fault. The method may further include performing a remedial action to repair the fault.

The method may further include positioning one or more further linear arrays of further acoustic sensors in the fluid proximate to the object and measuring, by the further acoustic sensors, the acoustic signals. The predicting of the far-field radiated acoustic field of the object further may use the measurements of the acoustic signals taken by the further acoustic sensors.

In yet another aspect, the present invention provides a method of predicting a far-field radiated acoustic field of a submarine in water. The method includes providing a linear array of acoustic sensors, positioning the array of acoustic sensors in the water proximate to the object submarine, wherein the submarine is surfaced such that at least a part of the submarine extends above a surface of the water, radiating into the water, by the submarine, one or more acoustic signals, measuring, by the acoustic sensors, the acoustic signals, and predicting, by one or more processors operatively coupled to the array of acoustic sensors, the far-field radiated acoustic field of the submarine using the measurements of the acoustic signals. The positioning of the array of acoustic sensors includes orienting the array in a direction that is substantially parallel to a longitudinal axis of the submarine and positioning the array in a near-field region of the submarine. The near-field region of the submarine is a region that is less than or equal to a distance of $2D^2/\lambda$ from the submarine, where D is a length of the submarine or a part thereof along the longitudinal axis of the submarine and $\lambda$ is a wavelength of the one or more of the acoustic signals transmitted by the submarine.

A ratio between a length of a direct path from the array of acoustic sensors to the object and a length of a surface-reflected path from the array of acoustic sensors to the object may be less than or equal to 0.9. Alternatively, the ratio may be less than or equal to 0.85, less than or equal to 0.8, less than or equal to 0.75, less than or equal to 0.7, less than or equal to 0.65, less than or equal to 0.6, less than or equal to 0.55, less than or equal to 0.5, less than or equal to 0.45, less than or equal to 0.4, less than or equal to 0.35, less than or equal to 0.3, less than or equal to 0.25, or less than or equal to 0.2, or less than or equal to 0.15, or less than or equal to 0.1, or less than or equal to 0.05.

The predicted far-field radiated acoustic field can be the predicted far-field radiated acoustic field of a dived submarine. The dived submarine can be considered to be a submarine at a depth of, for example, but not limited to, 100 m or greater.

In a further aspect, there is provided apparatus for predicting a far-field radiated acoustic field of an object in a fluid. The apparatus includes a linear array of acoustic sensors, the acoustic sensors being configured to measure acoustic signals in the fluid radiated by the object and one or more processors operatively coupled to the array of acoustic sensors. The one or more processors is configured to predict the far-field radiated acoustic field of the object using measurements taken by the acoustic sensors.

The array of acoustic sensors may be a uniform linear array of acoustic sensors.

Spacing between pairs of adjacent acoustic sensors in the array may be less than or equal to $\lambda/2$, where $\lambda$ is a wavelength of one or more of the acoustic signals.

The apparatus may further include a support structure, wherein the array of acoustic sensors is fixed to the support structure. The support structure may be a support structure selected from the group of support structures consisting of a support structure that is at least partially submerged in the water, a support structure that is remote from the water, a buoyant support structure floating on the water, a harbour wall, a dock wall, a wall of a shipyard, a wall of a submarine pen, a jetty, an oil rig, a watercraft, scaffolding, a pontoon, a raft, a buoy.

The array of acoustic sensors may include couplings attaching together pairs of adjacent acoustic sensors. The couplings may be flexible thereby to allow for the winding of the array onto a reel. Alternatively, the couplings may be rigid. The rigid couplings may include one or more hinges thereby to allow folding of the array, e.g., for storage on and/or deployment from the watercraft or submarine.

In yet another aspect, the present invention provides an apparatus for predicting a far-field radiated acoustic field of a submarine in water. The apparatus includes a linear array of acoustic sensors, the acoustic sensors being configured to measure acoustic signals in the water radiated by the submarine when the submarine is surfaced such that at least a part of the submarine extends above a surface of the water, and one or more processors operatively coupled to the array of acoustic sensors, the one or more processors being configured to predict the far-field radiated acoustic field of the submarine using the measurements taken by the acoustic sensors.

In a further aspect, there is provided a method of predicting a far-field radiated acoustic field of an object in water. The method includes providing a linear array of acoustic sensors, positioning the array of acoustic sensors submerged in the water proximate to the object, radiating into the water, by the object, one or more acoustic signals, measuring, by the acoustic sensors, the acoustic signals, and predicting, by one or more processors operatively coupled to the array of acoustic sensors, the far-field radiated acoustic field of the object using the measurements of the acoustic signals. The positioning of the array of acoustic sensors includes orienting the array in a direction that is substantially parallel to a longitudinal axis of the object and positioning the array in a near-field region of the object. The near-field region of the object is a region that is less than or equal to a distance of $2D^2/\lambda$ from the object, where D is a length of the object or a part thereof along the longitudinal axis of the object and $\lambda$ is a wavelength of the one or more of the acoustic signals transmitted by the object.

Advantageously, the method may be carried out and tends to provide relatively accurate results while the object is in the vicinity of interference causing surfaces or objects. For example, in the case of a submarine, the method may be performed while the submarine is surfaced and/or while the submarine is docked at a berth. Advantageously, the method may be carried out and tends to provide relatively accurate results using a much smaller number of measurements than is conventionally used, for example measurements that do not envelope the object. The methods and apparatuses tend to account for, and/or tend not to be significantly detrimentally affected by, unwanted reflections, for example from boundary surfaces and/or other disturbances.

Advantageously, the assessment of the far-field radiated noise of an object tends to provide the frequencies of the dominating noise tones. In addition, for each radiated noise tone, the far-field noise levels, the far-field azimuthal radiated noise pattern, and/or the position along the object from where the noise is being driven may be provided. The methods and apparatus may identify the noise sources that include, but are not limited to, rotating machinery and vibrating equipment.

Advantageously, the assessment of the far-field radiated noise of an object tends to be provided in a relatively short time compared to conventional methods. The assessment tends not to require the object to be located at a measurement range.

DETAILED DESCRIPTION

Figure 1:
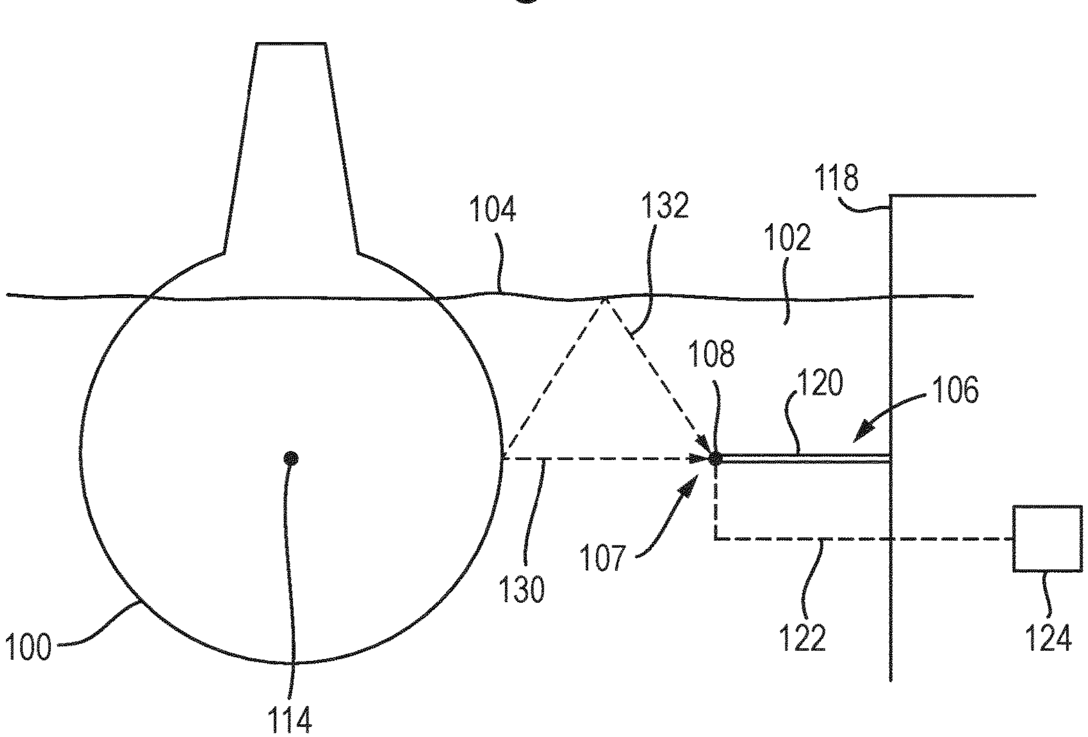
FIG. 1 is a schematic illustration (not to scale) of a front view of an arrangement of equipment predict a far-field radiated acoustic field of an object in water.

FIG. 1 is a schematic illustration (not to scale) of a front view of an arrangement of equipment used to practice an embodiment of a method of predicting a far-field radiated acoustic field of an object in water.

Figure 2:
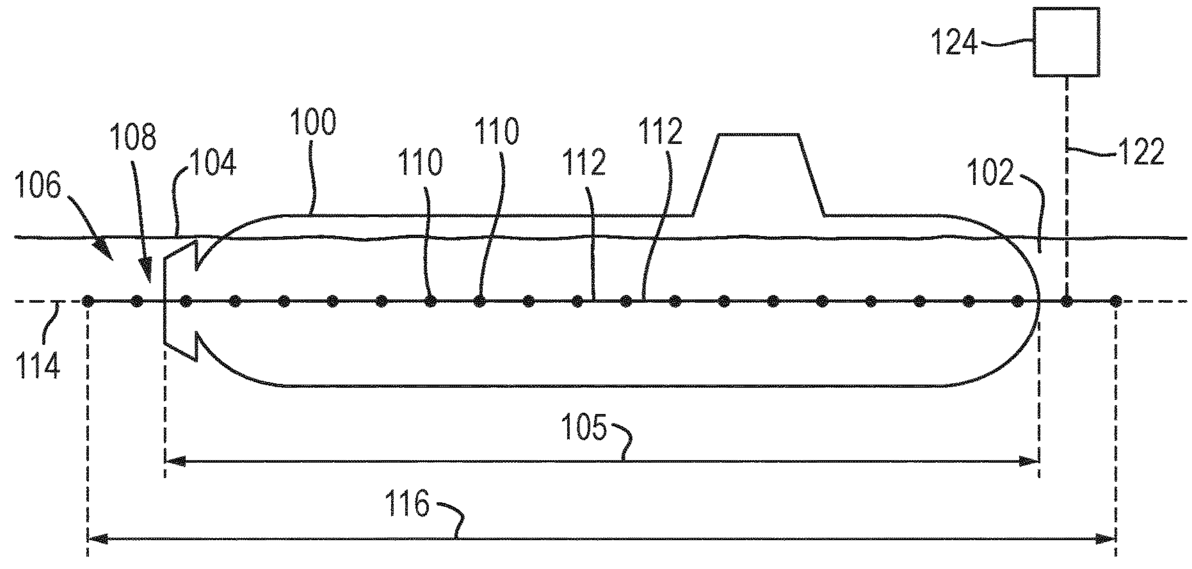
FIG. 2 is a schematic illustration (not to scale) of a side view of the arrangement of FIG. 1.

FIG. 2 is a schematic illustration (not to scale) of a side view of the arrangement of FIG. 1.

The arrangement comprises a watercraft 100 located in a body of water 102. The water in the body of water 102 may be salt water, fresh water, or brackish water. In this embodiment, the watercraft 100 is a submarine. In particular, the watercraft 100 is a surfaced submarine, i.e., a submarine that has at least part of its main hull above a surface 104 of the body of water 102. This may be, for example, a standard condition of a submarine in a jetty or alongside a dock. In some cases, the submarine could be trimmed to sit deeper in the water.

The watercraft 100 may be of any appropriate size. For example, a length 105 of the watercraft 100 may be up to 150 m.

The arrangement further comprises a measurement system 106. The measurement system comprises an array 108 comprising a plurality of acoustic sensors 110 attached together by a plurality of couplings 112. The acoustic sensors are indicated by solid-black circles in FIGS. 1 and 2, and the couplings 112 are indicated by lines connecting said solid-black circles.

The acoustic sensors 110 may be any appropriate acoustic sensors, such as acoustic transducer elements, hydrophones, particle velocity sensors, pressure sensors, and/or any combination thereof. The acoustic sensors 110 are configured to measure acoustic signals radiated (e.g., transmitted or emitted) by the watercraft 100. Specifically, there may be a noise source on the watercraft 100 that radiates the acoustic signals, e.g., an engine of the watercraft 100. In some embodiments, the ‘acoustic sensor’ can be any sensor that can measure a pressure field, a particle velocity, a particle acceleration, or any combination thereof.

In this embodiment, the acoustic signals received and measured by the acoustic sensors 110 may include acoustic signals that travelled along a direct path from the noise source to the acoustic sensors 110, through the transfer medium (i.e., the body of water 102), without undergoing any reflection. An example of such a direct acoustic signal is illustrated in FIG. 1 by a dashed arrow that represents a direct path 130.

In this embodiment, the acoustic signals received and measured by the acoustic sensors 110 may include acoustic signals that travelled along an indirect path from the noise source to the acoustic sensors 110. For example, the indirect path may include a reflection at boundary surfaces such as, but not limited to, a surface of the support structure 118, the surface 104 of the body of water 102, the floor of the body of water 102, and a surface of the watercraft 100. An example of an acoustic signal travelling along such a path is a surface-reflected path 132 as illustrated in FIG. 1 by a dashed arrow. The surface-reflected path includes a reflection at the surface 104 of the body of water 102. In other words, the surface reflected path comprises an incident path extending from the watercraft 100 (e.g., from the noise source) to a point on the surface 104. The incident path is at an angle of incidence to the normal of the surface 104. The surface-reflected path also comprises a reflected path extending from the point where the incident path meets the surface 104 to the acoustic sensor 110. The reflected path is at an angle of reflection to the normal of the surface 104. The angle of incidence and the angle of reflection are equal to each other.

Pairs of adjacent acoustic sensors 110 are attached together by respective couplings 112 disposed therebetween.

The couplings 112 may be flexible. For example, the couplings 112 may be made of rope, wire, or flexible plastic. This may facilitate removal of the array 108 from the body of water 102 and/or storage of the array 108. For example, the array 108 may be wound onto a reel. Alternatively, the couplings 112 may be rigid. This tends to maintain desired spacings between the acoustic sensors 110 thereby tending to improve the accuracy of the measurements of the acoustic signals. In these embodiments, the couplings 112 may further comprise hinges such that the array 108 may be folded, e.g., for storage on and/or deployment from the watercraft 100 or submarine.

The array 108 of acoustic sensors 110 is located in the body of water 102 and is submerged beneath the surface 104. The array 108 is a linear array of sensors 110 that, in this embodiment, comprises a single line of acoustic sensors 110. The acoustic sensors 110 of the array 108 are arranged spaced-apart from one another along a single line. The array 108 may define a substantially straight line of acoustic sensors 110. The array 108 may be positioned such that the line of acoustic sensors 110 is substantially horizontal, e.g., parallel with the surface 104 of the body of water 102.

The array 108 of acoustic sensors 110 is submerged beneath the surface 104 such that the array 108 is alongside the watercraft 100, i.e., at the same depth as at least a part of the watercraft 100. Preferably, the array 108 is at a depth beneath the surface 104 substantially equal to that of a central or longitudinal axis 114 of the watercraft 100. The array 108 may be arranged such that it is substantially parallel with the longitudinal axis 114 of the watercraft 100. The array 108 may be at a depth beneath the surface 104 of, for example, up to 10 m, such as between 3 m and 5 m.

The array 108 of acoustic sensors 110 may be positioned such that a ratio of a length of the direct path to a length of the surface-reflected path is less than or equal to 0.9. For example, the ratio of the length of the direct path to a length of the surface-reflected path can be any ratio selected from a list of ratio consisting of less than or equal to 0.85, less than or equal to 0.8, less than or equal to 0.75, less than or equal to 0.7, less than or equal to 0.65, less than or equal to 0.6, less than or equal to 0.55, less than or equal to 0.5, less than or equal to 0.45, less than or equal to 0.4, less than or equal to 0.35, less than or equal to 0.3, less than or equal to 0.25, less than or equal to 0.2, less than or equal to 0.15, less than or equal to 0.1, less than or equal to 0.05, less than or equal to ⅓, and less than or equal to ¼.

The noise source may be at a depth (from or beneath the surface 104) of less than or equal to 10 m, or less than or equal to 9 m, or less than or equal to 8 m, or less than or equal to 7 m, or less than or equal to 6 m, or less than or equal to 5 m, or less than or equal to 4 m, or less than or equal to 3 m, or less than or equal to 2 m, or less than or equal to 1 m, or 1 m to 10 m, or 2 m to 9 m, or 3 m to 8 m, or 4 m to 7 m, or more preferably about 8 m.

The array 108 of sensors 110 may be positioned at a distance from the noise source or hull of the submarine of less than or equal to 10 m, or less than or equal to 9 m, or less than or equal to 8 m, or less than or equal to 7 m, or less than or equal to 6 m, or less than or equal to 5 m, or less than or equal to 4 m, or less than or equal to 3 m, or less than or equal to 2 m, or less than or equal to 1 m, or 1 m to 5 m, or 2 m to 4 m, or 2 m to 3 m or more preferably about, but not restricted to 2 m or 3 m.

The array 108 of sensors 110 may be at the same depth as the point of maximum diameter of the submarine, or shallower or deeper. The array 108 of sensors 110 may be at a depth of less than or equal to 10 m, or less than or equal to 9 m, or less than or equal to 8 m, or less than or equal to 7 m, or less than or equal to 6 m, or less than or equal to 5 m, or less than or equal to 4 m, or less than or equal to 3 m, or less than or equal to 2 m, or less than or equal to 1 m, or 1 m to 10 m, or 2 m to 9 m, or 3 m to 8 m, or 4 m to 7 m, or more preferably about 8 m.

The length 116 of the array 108 may be application dependent. Preferably, the length 116 of the array 108 is greater than or equal to the length 105 of the watercraft 100. Preferably, the array 108 is positioned relative to the watercraft 100 such that the array 108 is alongside the watercraft 100 and extends forwards of the front end (or bow) of the watercraft 100 and also extends rearwards of the rear end (or stem) of the watercraft 100. A distance that the array extends forwards and/or rearward of the end(s) of the watercraft 100 may be, for example, up to about 10 m. An array 108 that is shorter than the length 105 of the watercraft 100 may be used to assess the radiated noise of a part or section of the watercraft 100. Preferably, the array 108 should extend beyond this part or section of the watercraft 100.

The number of acoustic sensors 110 in the array 108 may be application dependent. In some embodiments there are multiple hundreds of acoustic sensors 110.

The spacing of the acoustic sensors 110 in the array 108 may be application dependent. The acoustic sensors 110 may be spaced apart substantially equally along the length of the array 108, i.e., the array 108 may be a uniform linear array. Preferably, the spacing between pairs of adjacent acoustics sensors 110 is less than or equal to about half of the wavelength of the highest frequency acoustic signals to be measured.

In this embodiment, the array 108 is located in the near-field of the acoustic signal radiating object, i.e., the watercraft 100. The near-field of the sound field radiated by the watercraft 100 is understood to be the part of the sound field that is at a distance less than or equal to the Fraunhofer distance from the transmitting surface of the watercraft 100. The Fraunhofer distance of the watercraft 100 is $2D^2/\lambda$, where D is the length 105 of the watercraft 100 (or in some embodiments, a length of a subsection or part of interest of the watercraft 100), and $\lambda$ is the wavelength of the signals of interest produced by the watercraft 100. More preferably, the array 108 is located at a distance of less than or equal to $D^2/\lambda$ from the transmitting surface of the watercraft 100. More preferably, the array 108 is located at a distance of less than or equal to $D^2/2\lambda$ from the transmitting surface of the watercraft 100. More preferably, the array 108 is located at a distance of less than or equal to $D^2/5\lambda$ from the transmitting surface of the watercraft 100. In some embodiments, the distance between the watercraft 100 and the array 108 may be less than the depth of the array 108 below the water surface 104. In some embodiments, the distance between the watercraft 100 and the array 108 may be less than or equal to 10 m, or more preferably less than or equal to 9 m, or more preferably less than or equal to 8 m, or more preferably less than or equal to 7 m, or more preferably less than or equal to 6 m, or more preferably less than or equal to 5 m, or more preferably less than or equal to 4 m, or more preferably less than or equal to 3 m.

In this embodiment, the array 108 is fixed to a support structure 118. The support structure 118 may be at least partially submerged in the body of water 102. The array 108 is fixed to the support structure 118 by further couplings 120. The support structure 118 may be, for example, a harbour or dock wall, the wall of a shipyard, the wall of a submarine pen, a jetty, an oil rig, another watercraft, or submerged scaffolding. Alternatively, or additionally, the array 108 may be coupled to a different type of support structure, such as a support structure that is out of the body of water 102, or a buoyant support structure floating on the body of water 102. Examples of appropriate buoyant support structures include, but are not limited to, pontoons, rafts, and buoys. The support structure is a support structure selected from a group of support structures consisting of a support structure that is at least partially submerged in the water, a support structure that is remote from the water, a buoyant support structure floating on the water, a harbour wall, a dock wall, a wall of a shipyard, a wall of a submarine pen, a jetty, an oil rig, a watercraft, scaffolding, a pontoon, a raft, a buoy. Examples of alternative support structures are described in more detail later below with reference to FIGS. 3 and 4.

In this embodiment, each of the acoustic sensors 110 is coupled via a wired or wireless communications link 122 (represented in FIGS. 1 and 2 by a dashed line) to a processor 124. The acoustic sensors 110 are configured to send electric signals indicative of the acoustic measurements to the processor 124 via the communications link 122.

The processor 124 is configured to process the received acoustic measurements to estimate, determine, reconstruct, or predict the far-field radiated acoustic field of the watercraft 100 in water. The processor 124 may implement any appropriate method of estimating, determining, reconstructing, or predicting the far-field radiated acoustic field. For example, in some embodiments, the processor 124 may predict the far-field radiated acoustic field of the watercraft 100 using the Kirchhoff-Helmholtz integral. Further information on the Kirchhoff-Helmholtz integral and its use may be found in, for example, Junger and Feit, "Sound, Structures, and Their Interaction" (second edition), The MIT Press, Cambridge, Massachusetts, 1986, the contents of which are incorporated herein by reference.

An apparatus, including the processor 124, for implementing the above arrangement and performing the method steps to be described below may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM etc., or any combination of these or other storage media.

Figure 3:
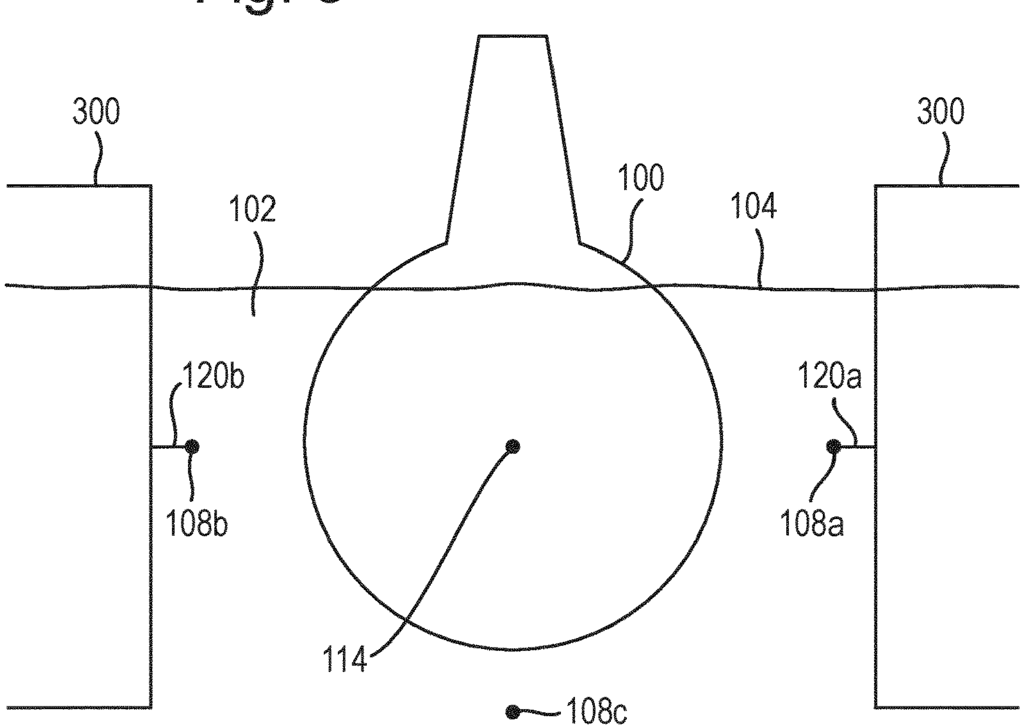
FIG. 3 is a schematic illustration (not to scale) of a further arrangement.

FIG. 3 is a schematic illustration (not to scale) of a front view of an alternative arrangement of equipment used to predict the far-field radiated acoustic field of the watercraft 100. In this embodiment, a plurality of arrays 108*a-c* are implemented; however, it will be appreciated by those skilled in the art that one or more of the arrays 108*a-c* may be omitted, and/or additional arrays may be used (e.g., an array 108 coupled to a dock or harbour wall).

In the embodiment of FIG. 3, the watercraft 100 is a surfaced submarine. The watercraft 100 is located in or proximate to a floating dock 300. A first array 108*a* and a second array 108*b* are attached to the floating dock 300 by respective couplings 120*a*, 120*b*. The first array 108*a* and the second array 108*b* are located at opposite sides of the watercraft 100, substantially level with the longitudinal axis 114 of the watercraft 100. A third array 108*c* is positioned below the keel of the watercraft 100. The third array 108*c* may be secured to, for example, a bed of the body of water 102 and/or the floating dock 300.

Figure 4:
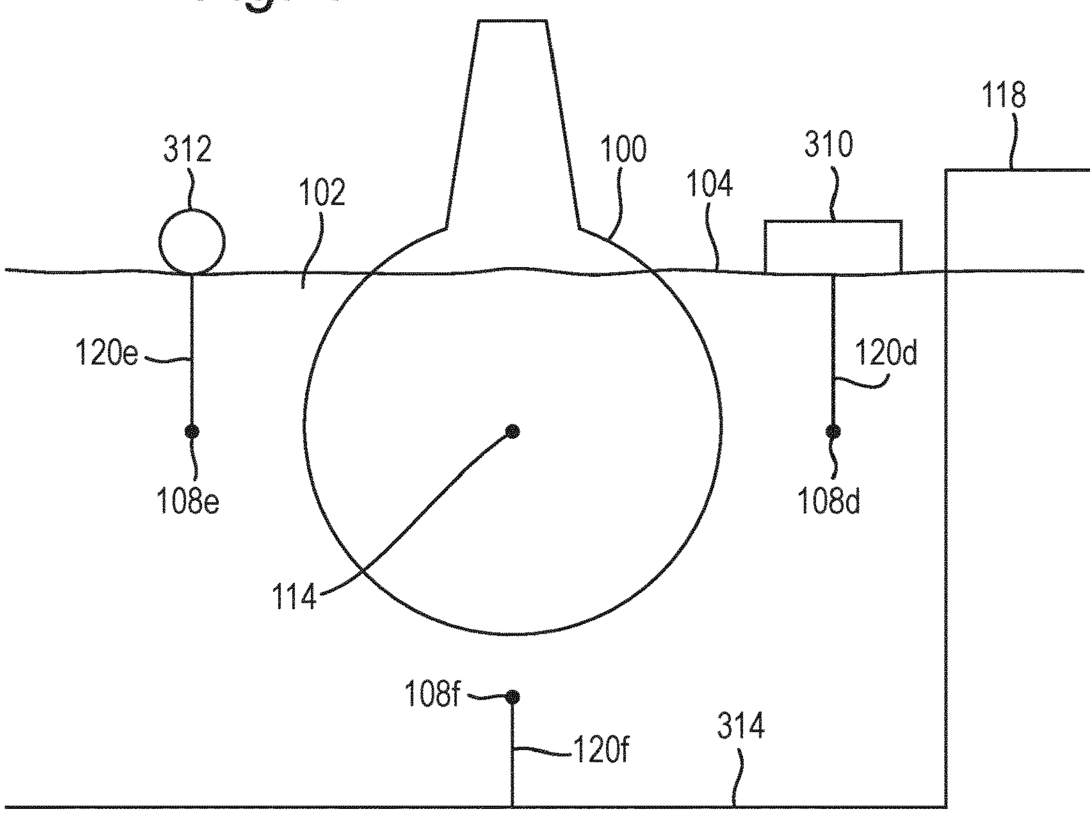
FIG. 4 is a schematic illustration (not to scale) of a yet further arrangement.

FIG. 4 is a schematic illustration (not to scale) of a front view of another alternative arrangement of equipment used to predicting a far-field radiated acoustic field of the watercraft 100. In this embodiment, a plurality of arrays 108*d-f* are implemented; however, it will be appreciated by those skilled in the art that one or more of the arrays 108*d-f* may be omitted, and/or additional arrays may be used (e.g., an array 108 coupled to a dock or harbour wall).

In the embodiment of FIG. 4, the watercraft 100 is a surfaced submarine. A fourth array 108*d* is attached to a pontoon 310 by a respective coupling 120*d*. A fifth array 108*e* is attached to a buoy 312 by a respective coupling 120*e*. The fourth array 108*d* and the fifth array 108*e* are located at opposite sides of the watercraft 100, substantially level with the longitudinal axis 114 of the watercraft 100. A sixth array 108*f* is positioned below the keel of the watercraft 100. In this embodiment, the sixth array 108*f* is secured to a bed 314 of the body of water 102 by a respective coupled 120*f*.

Advantageously, securing an array 108 to a device that floats on the body of water 102 (e.g., a pontoon or a buoy) tends to facilitate maintaining that array 108 at a constant depth below the water surface 104.

Figure 5:
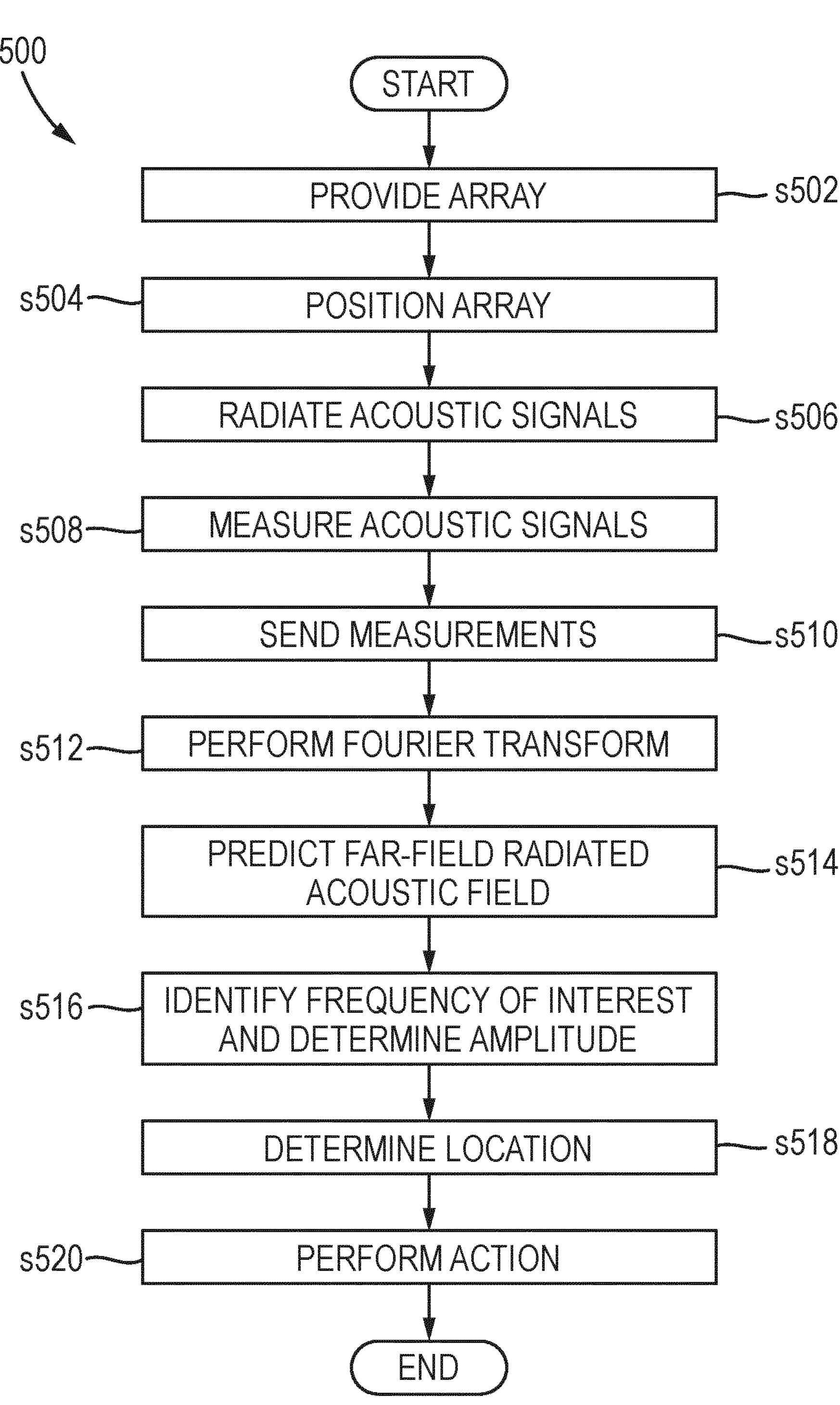
FIG. 5 is a process flow chart showing certain steps of a method of predicting the far-field radiated acoustic field of the object.

FIG. 5 is a process flow chart showing certain steps of a method 500 of estimating, determining, reconstructing, or predicting the far-field radiated acoustic field of the watercraft 100 implemented by an above-described arrangement of equipment. The method may predict the far-field radiated acoustic field of the watercraft 100 when it is submerged completely below the water surface 104, e.g., at a depth of 100 m or greater.

It should be noted that certain of the process steps depicted in the flowchart of FIG. 5 and described below may be omitted, or such process steps may be performed in differing order to that presented below and shown in FIG. 5. Furthermore, although all the process steps have been depicted, for convenience and ease of understanding, as discrete temporally sequential steps, nevertheless some of the process steps may in fact be performed simultaneously or at least overlapping to some extent temporally.

At step s502, the array 108 of acoustic sensors 110 is provided.

For example, in some embodiments, such as embodiments in which the couplings 112 are flexible, the array 108 may be provided in a state where the array is wound on a reel or may be flexible to allow for winding of the array onto a reel.

At step s504, the array 108 of acoustic sensors 110 is submerged in the water 102 and positioned proximate to the watercraft 100. For example, the method can comprise positioning the array 108 of acoustic sensors 110 such that the length of the direct path 130 is less than half of the length of the surface-reflected path 132. Preferably, the array 108 of sensors 110 is also positioned at the same or similar depth as the noise source of the watercraft 100.

For example, in embodiments in which the array 108 is stored wound on a reel, the array 108 may be unwound from the reel into the body of water 102 alongside the watercraft 100.

In other embodiments, such as those in which the couplings 112 are rigid or omitted from the array 108, the array 108 may be pre-installed and attached to the support structure 118. For example, in some embodiments, the array 108 may be permanently or semi-permanently fixed to the support structure and submerged in the water 102 so as to provide a permanent or semi-permanent watercraft measurement facility.

In this embodiment, the array 108 and the watercraft 100 are relatively positioned such that the array 108 is oriented in a direction that is substantially parallel to the longitudinal axis 114 of the watercraft 100. Thus, the array 108 is arranged approximately parallel to the largest dimension, longitude, or diameter of the object being measured.

In this embodiment, the array 108 and the watercraft 100 are relatively positioned such that the array 108 is in the near-field region of the watercraft 100. The near-field region of the watercraft 100 is a region that is less than or equal to a distance of $2D^2/\lambda$ from the watercraft 100, where D is a length of the watercraft 100 (or a part thereof) along the longitudinal axis 114, and $\lambda$ is a wavelength of one or more of the acoustic signals that is to be radiated by from the watercraft 100.

At step s506, the watercraft 100 radiates acoustic signals into the water 102. The terminology "radiate" may be used herein to refer to any form of transmission, emission, radiation, disturbance of the water, etc.

In some embodiments, some or all of the acoustic signals radiated by or from the watercraft 100 may be signals resulting from the operation of one or more component parts of the watercraft 100, such as engines, turbines, pumps, valves, conduits, sonar arrays, or communications equipment. The acoustic signals may result from vibration of the one or more component parts, which may be operated in a planned sequence to determine each equipment's contribution to the total radiated noise.

In some embodiments, devices for creating vibration or noise are installed on or in the watercraft 100 and operated to generate some or all of the acoustic signals. For example, so-called "shakers", driven by signal generators, may be used to vibrate or strike parts of the watercraft 100 thereby to generate acoustic signals.

At step s508, the acoustic sensors 110 measure the acoustic signals.

The acoustic signals received and measured by the acoustic sensors 110 may include acoustic signals that travel directly from the source to the acoustic sensors 110, through the transfer medium (i.e., the water 102), without undergoing any reflection. An example of such a direct acoustic signal is illustrated in FIG. 1 by a dashed arrow that represents a direct path 130.

The acoustic signals received and measured by the acoustic sensors 110 may include acoustic signals that reflect from one or more surfaces of or within the water 102. For example, acoustic signals may be reflected from boundary surfaces such as, but are not limited to, a surface of the support structure 118, the surface 104 of the body of water 102, the floor of the body of water 102, and a surface of the watercraft 100. An example of such a reflected or indirect acoustic signal is illustrated in FIG. 1 by a dashed arrow that represents a surface-reflected path 132.

At step s510, the acoustic sensors 110 send the measurements of the acoustic signals to the processor 124 via the communications link 122.

At step s512, the processor 124 Fourier transforms the measurements of the acoustic signals from the spatial domain into the frequency domain.

At step s514, the processor 124 predicts the far-field radiated acoustic field of the watercraft 100 using the Fourier transformed measurements of the acoustic signals.

In this embodiment, any appropriate process of predicting the far-field radiated acoustic field using near-field acoustic measurements may be used. For example, a methodology based on the Kirchhoff-Helmholtz integral equation may be implemented. A prediction of the far-field radiated acoustic field may be made for far-field noise on one or more sides of the watercraft 100, e.g., using only measurements from the array 108 on that side of the watercraft 100. In an evaluation of the Kirchhoff-Helmholtz integral, the values of pressure and particle velocity may be unknown over most of a notional surface surrounding the watercraft 100. All unknown values may be set to zero in the evaluation of the Kirchhoff-Helmholtz integral. The values of the pressure where measured may be used in the integral. A multiplicative scaling factor for the evaluated integral may be determined by comparing the perfect far-field of a point source with that predicted from the reduced data set. The calculated value, i.e., the result of the Kirchhoff-Helmholtz integral, may then be multiplied by the determined multiplicative scaling factor.

Thus, advantageously, the method 500 tends not to use or require pressure and/or particle velocity measurements over a complete surrounding surface. Advantageously, the method 500 may be performed using, for example, only sound pressure measurements at the acoustic sensors 110 on the array(s) 108. However, more preferably, a combination of sound pressure measurements and particle velocity measurements is used.

Thus, the method 500 of estimating, determining, reconstructing, or predicting the far-field radiated acoustic field of the watercraft 100 may be implemented.

FIGS. 6 to 14 illustrate example simulated results of steps s502 to s514 of the method 500 for various different types of acoustic signal sources. The sources modelled to generate these simulated results may be simple point sources, spatially extended sources, spatially extended sources that drive the sound in an arbitrary direction and spatially extended sources that effectively create an evanescent field. In the following examples, a spatial source is represented by a collection of point sources.

Each of FIGS. 6 to 14 shows a respective first plot 400 and a second plot 402.

For each of FIGS. 6 to 14, the first plot 400 has an x-axis 404 representative of a distance measured in metres, and a y-axis 406 representative of a distance measured in metres. For each of FIGS. 6 to 14, the first plot 400 schematically illustrates a spatial relationship between the array 108 of the acoustic sensors 110 and one or more acoustic signal sources 408. Specifically, for each of FIGS. 6 to 14, the first plot 400 depicts the array 108 comprising twenty acoustic sensors 110 spaced apart at 1.5 m intervals along a straight line parallel to the x-axis 404. For each of FIGS. 6 to 14, the first plot 400 depicts a minimum distance between the array 108 and the acoustic signal sources 408 (i.e., a "stand-off") of 3 m.

For each of FIGS. 6 to 14, the second plot 402 has an x-axis 410 representative of a broadside angle measured in degrees, and a y-axis 412 representative of an amplitude (i.e., a power, level, or strength) of the far-field radiated acoustic field measured in decibels (dB).

Each second plot 402 schematically illustrates a comparison between the exact sound field the different sources 408 would generate in an unbounded medium (indicated by a first line 420), and the prediction determined by performed steps s501-s514 based on the near-field measurements (indicated by a second line 422). The first line 420 shows the perfect far-field acoustic field, modelled propagating through water with no reflective surfaces (e.g., no water surface or seabed), and propagating through that water with a constant sound speed, i.e., with no ray bending. In contrast, the second line 422 is the predicted far-field radiated acoustic field predicted using the near-field measurements taken by the array 108 including the interfering reflection from boundary surfaces such as the water surface 104.

Figure 6:
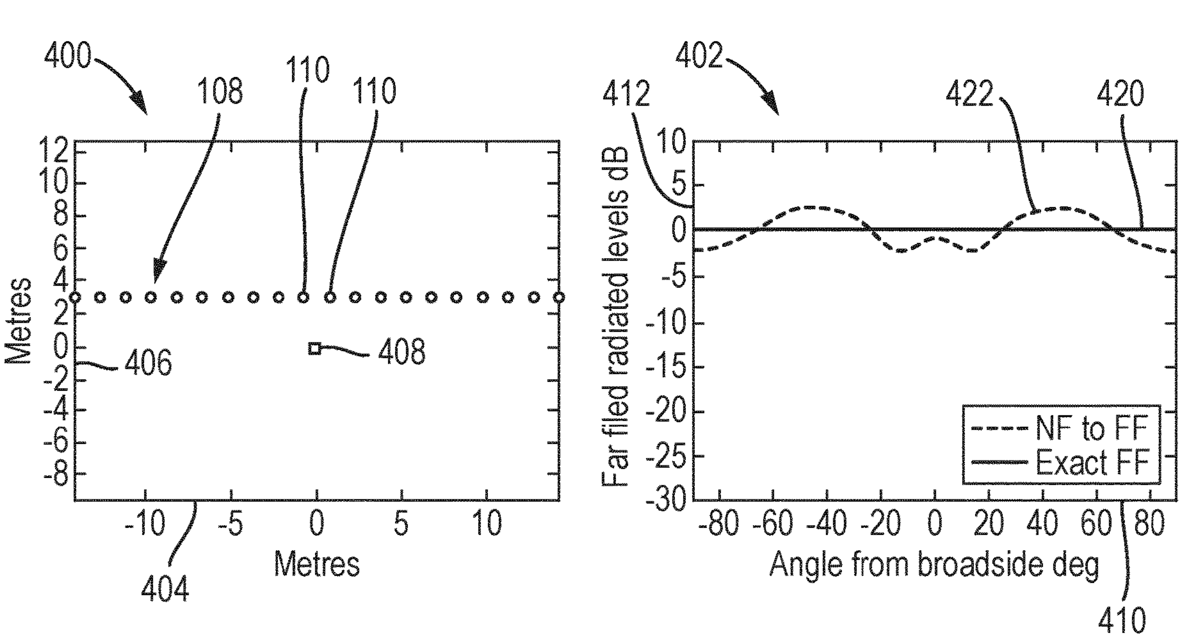
FIGS. 6 to 14 illustrate example simulated results of the method of predicting the far-field radiated acoustic field of the object.

FIG. 6 is a schematic illustration illustrating simulated results for a point source 408 that transmits acoustic signals at a frequency of 200 Hz. The array 108 and the point source 408 both have a depth of 4 m below the surface 104 of the body of water 102.

Figure 7:
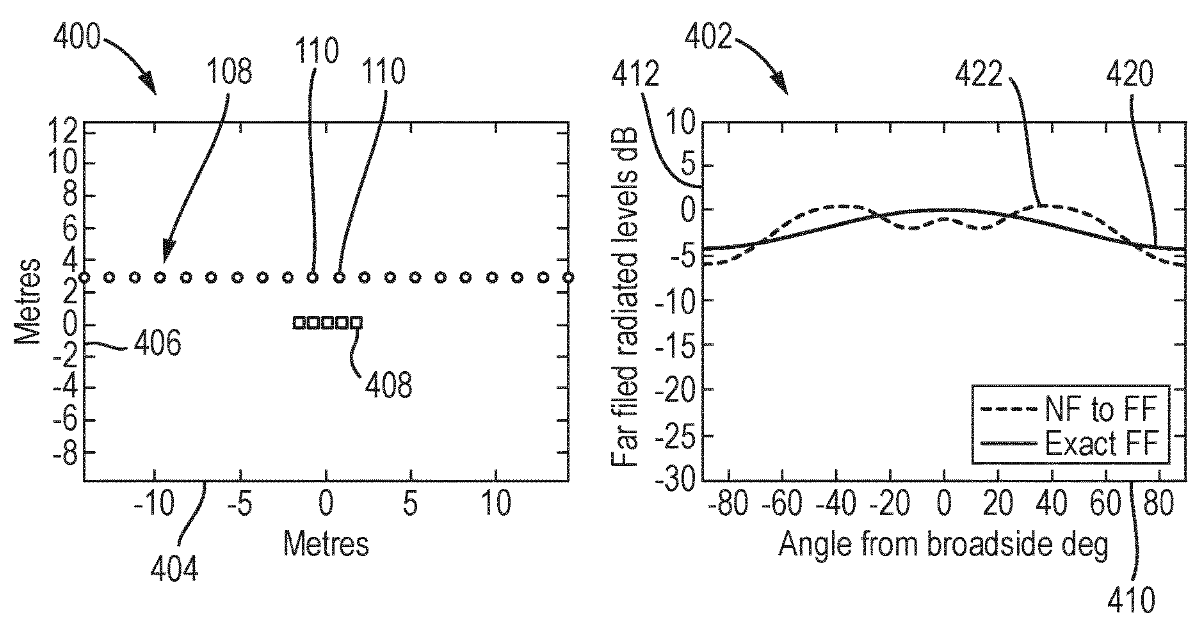

FIG. 7 is a schematic illustration (not to scale) illustrating simulated results for a spatially extended source 408 of length 3.2 m that transmits an acoustic signal at a frequency of 200 Hz. The spatial source is simulated by five point sources 408 spaced apart at 0.8 m intervals along a straight line. The array 108 and the acoustic signal sources 408 have depths of 4 m below the surface 104 of the body of water 102.

Figure 8:
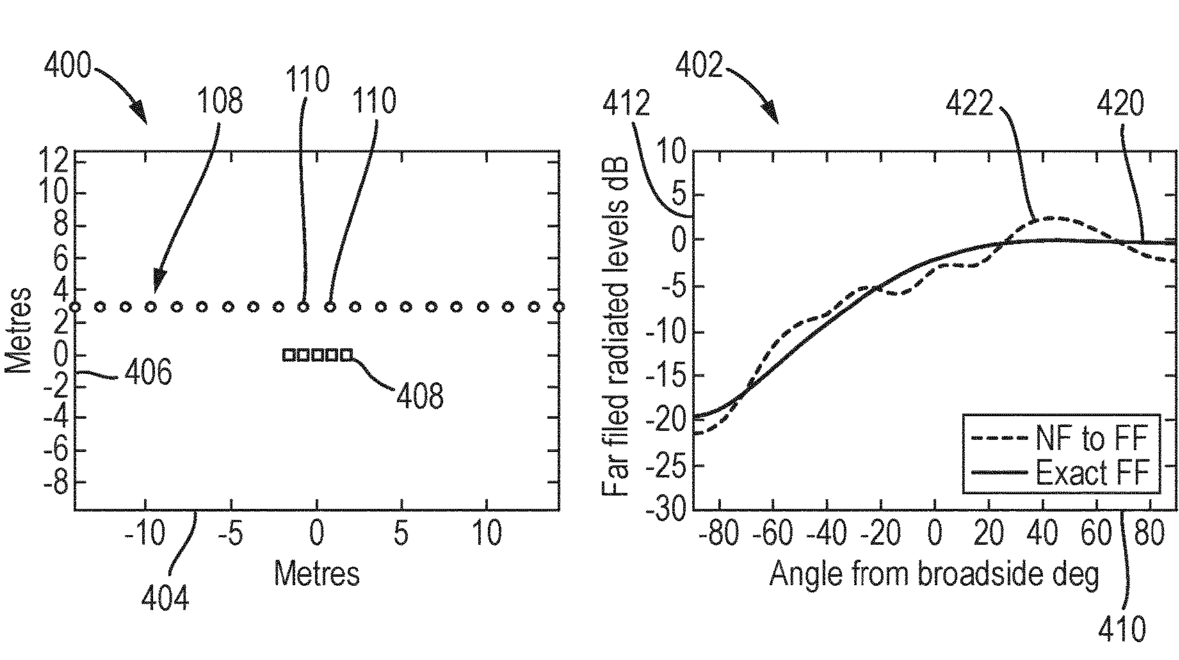

FIG. 8 is a schematic illustration (not to scale) illustrating a spatially extended source that is beaming sound at an angle of 45 degrees to the receiver array 108. The acoustic signal has a frequency of 200 Hz. The array 108 and the acoustic signal sources 408 have depths of 4 m below the surface 104 of the body of water 102.

Figure 9:
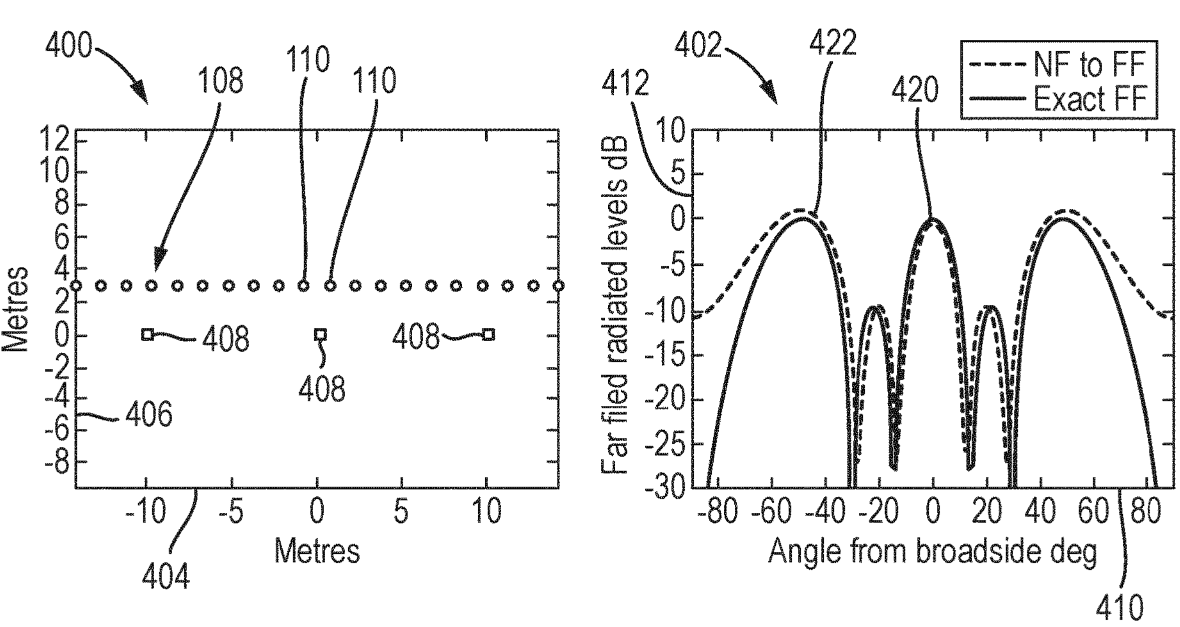

FIG. 9 is a schematic illustration (not to scale) illustrating simulated results for a set of three widely separated acoustic signal sources 408 that transmit acoustic signals at a frequency of 200 Hz, in phase with each other. The acoustic signal sources 408 are spaced apart at 10 m intervals along a straight line. The array 108 and the acoustic signal sources 408 have depths of 4 m below the surface 104 of the body of water 102.

Figure 10:
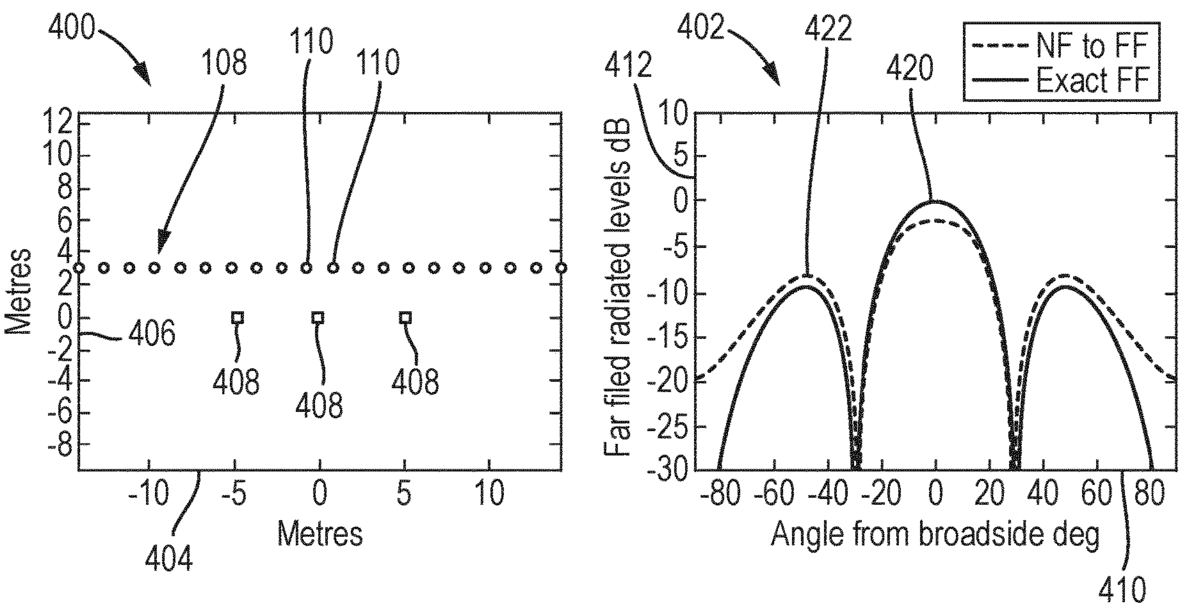

FIG. 10 is a schematic illustration (not to scale) illustrating simulated results for a set of three acoustic signal sources 408 that transmit acoustic signals at a frequency of 200 Hz, in phase with each other. The acoustic signal sources 408 are spaced apart at 5 m intervals along a straight line. The array 108 and the acoustic signal sources 408 have depths of 4 m below the surface 104 of the body of water 102.

Figure 11:
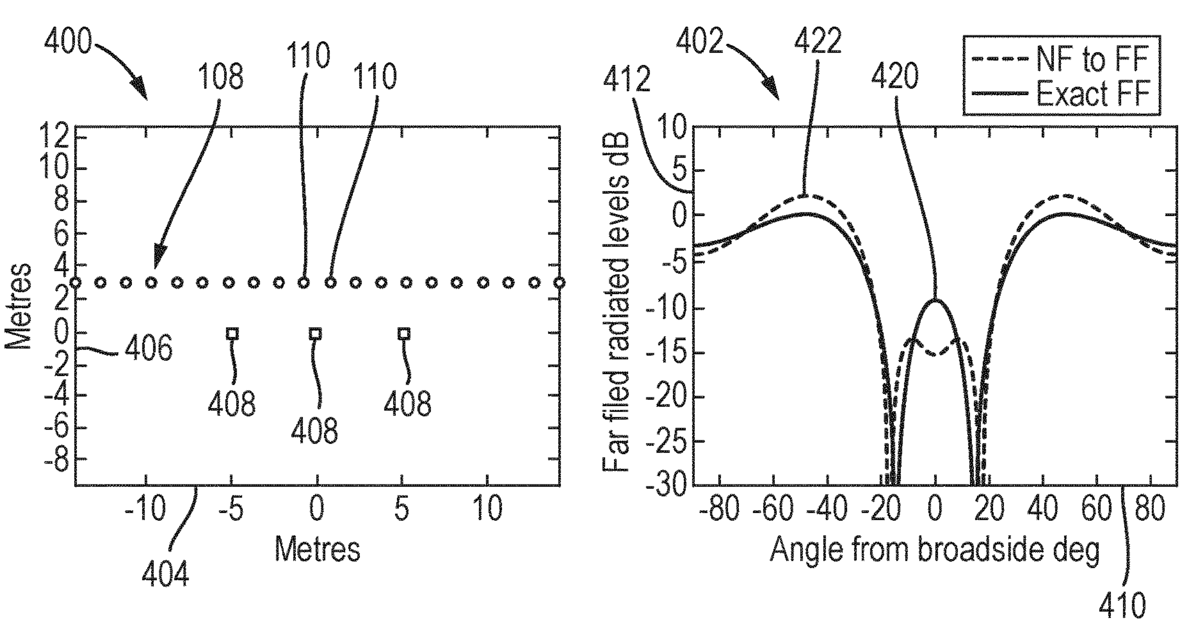

FIG. 11 is a schematic illustration (not to scale) illustrating simulated results for a set of three acoustic signal sources 408 that transmit acoustic signals at a frequency of 200 hertz (Hz), with the outer two sources in phase with each other and the central source exactly out of phase with the outer two sources. The acoustic signal sources 408 are spaced apart at 5 m intervals along a straight line. The array 108 and the acoustic signal sources 408 have depths of 4 m below the surface 104 of the body of water 102.

Figure 12:
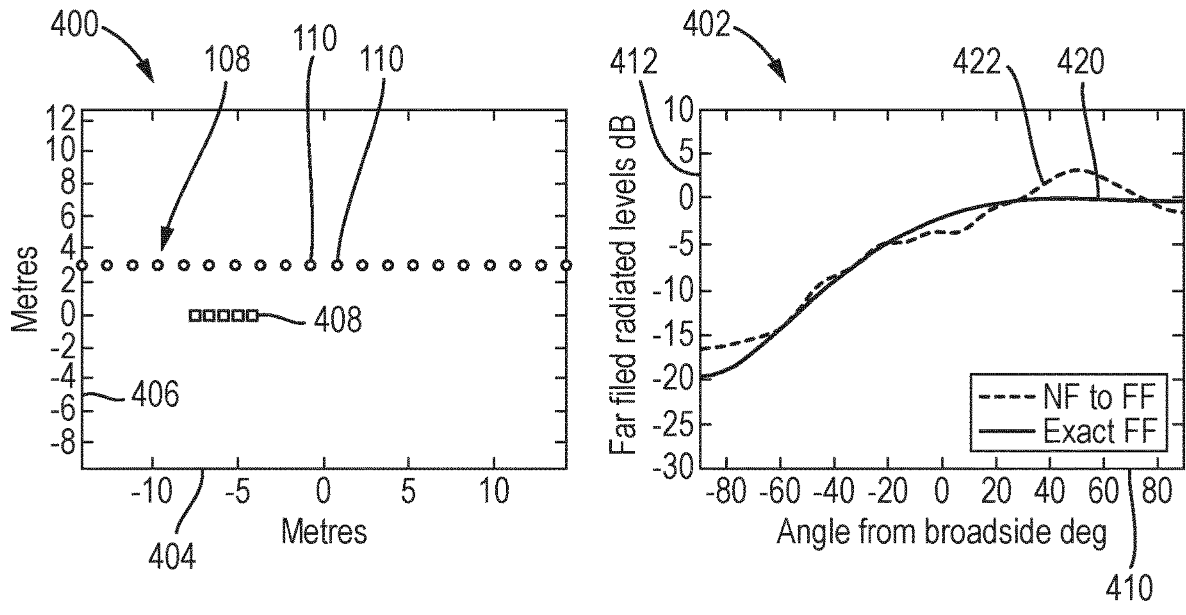

FIG. 12 is a schematic illustration (not to scale) illustrating simulated results for the same set-up as in FIG. 8, except with the array 108 offset from the acoustic signal sources by a distance of −6 m. The acoustic signal sources 408 transmit acoustic signals with a beam steer angle of 45°. The array 108 and the acoustic signal sources 408 have depths of 4 m below the surface 104 of the body of water 102. Advantageously, the method of predicting the radiated far-field acoustic field tends to be insensitive to the position of the source as long as the array overlaps the source position. In this case the sound radiates at an angle of 45 degrees to the normal to the source line.

Figure 13:
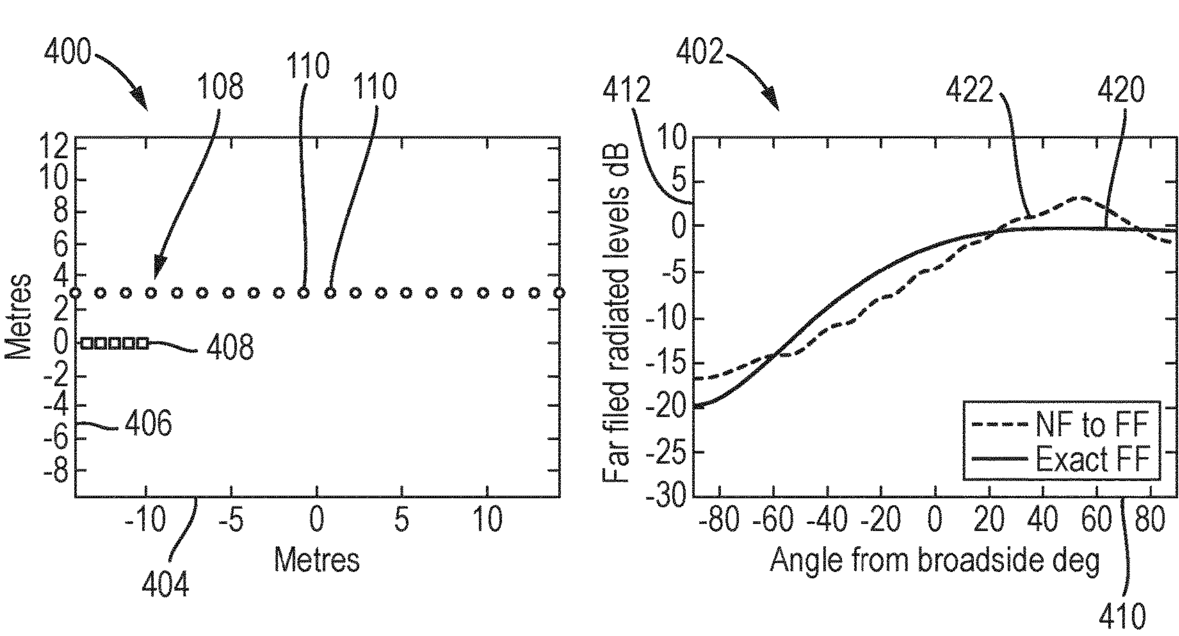

FIG. 13 is a schematic illustration (not to scale) illustrating simulated results for the same set-up as in FIG. 8, except with the array 108 offset from the acoustic signal sources by a distance of −12 m. The acoustic signal sources 408 transmit acoustic signals with a beam steer angle of 45°. The array 108 and the acoustic signal sources 408 have depths of 4 m below the surface 104 of the body of water 102.

Figure 14:
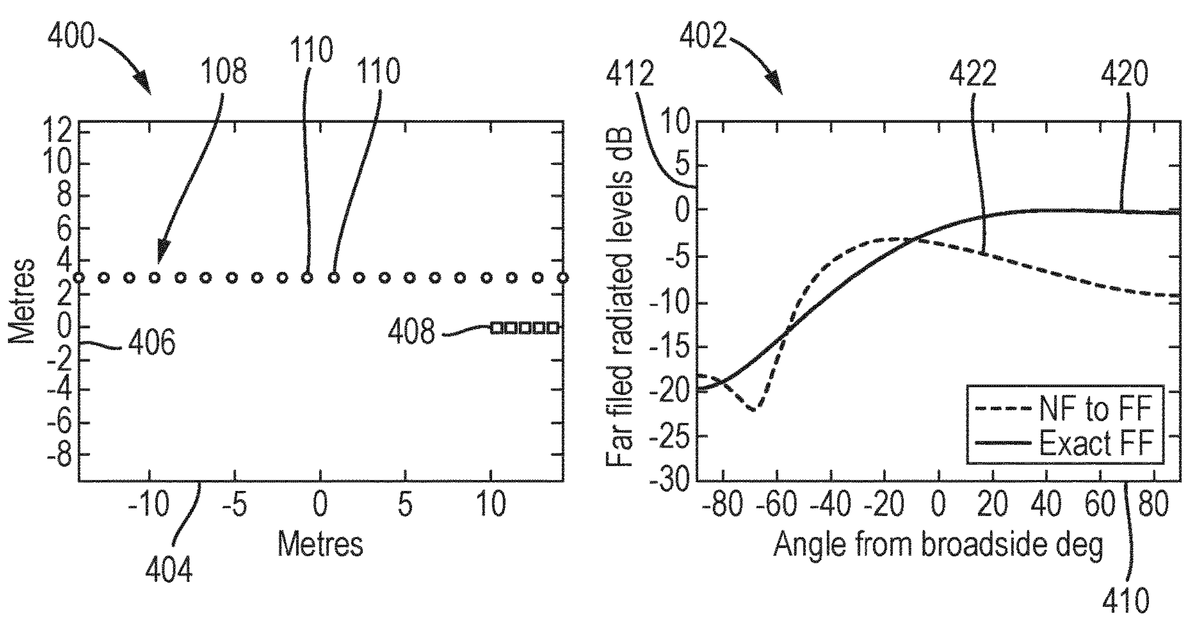

FIG. 14 is a schematic illustration (not to scale) illustrating simulated results for a set of five acoustic signal sources 408 that transmit acoustic signals at a frequency of 200 Hz. The acoustic signal sources 408 are spaced apart at 0.8 m intervals along a straight line. The acoustic signal sources 408 are offset from being aligned with a centre of the array 108 by an offset distance of +12 m. The acoustic signal sources 408 transmit acoustic signals have a beam steer angle of 45°. The array 108 and the acoustic signal sources 408 have depths of 4 m below the surface 104 of the body of water 102. FIG. 14 shows a scenario where there is no overlap of the receive array 108 beyond the source 408. The sound is beamed at 45 degrees to the right of the source 408 and thus, in this example, some of the field is not captured by the array 108. Advantageously, the method nevertheless gives a useful, albeit less accurate, prediction of the far-field acoustic signal.

Returning now to the description of FIG. 5, the below-described steps s516 to s520 of the method 500 are optional steps that may be performed based on the predicted far-field radiated acoustic field of the watercraft 100.

At step s516, an amplitude of the predicted far-field radiated acoustic field of the watercraft 100 at a frequency of interest may be determined. This may be performed by the processor 124 or read by an operator from a displayed representation of the predicted far-field radiated acoustic field. The frequency of interest may be a frequency associated with a component onboard the watercraft 100, for example from rotating or vibrating machinery.

A frequency analysis of the noise field tends to show frequency tones above the background noise. One or more such frequency tones may be selected and the far-field noise levels, the azimuthal radiation pattern, and/or the source position along the hull of the watercraft 100 may be determined. Noise components at discrete frequencies may be selected, for example, by an operator, technical expert of the watercraft 100, or by the processor 124.

At step s518, the processor 124 processes the acoustic measurements taken by the acoustic sensors 110 to determine respective physical locations of one or more sources of acoustic signals having the frequency of interest. The determined physical locations may be relative to the array 108. The determined physical locations may be on board the watercraft 100.

The determining of the locations of the one or more sources of acoustic signals may comprise performing near-field beam steering using the array of acoustic sensors.

In some embodiments, the respective physical locations of one or more sources of acoustic signals having the frequency of interest are determined responsive to those acoustic signals having a level or amplitude that exceeds a predetermined threshold amplitude. In some embodiments, there may be considered to be a fault with one or more components of the watercraft 100 (such as the component associated with frequency of interest) if the acoustic signals having the frequency of interest have a level or amplitude that exceeds the predetermined threshold amplitude or exceeds a previous level that may have been determined by this method or by alternative methods. This tends to be useful to determine the degradation of equipment on the watercraft 100. Conversely, there may be considered to be no fault with the one or more components of the watercraft 100 if the acoustic signals having the frequency of interest have a level or amplitude that is at or below the predetermined threshold amplitude. Repairs to equipment that have been identified at earlier applications of the method may be checked to see if the problem has been solved.

In this way, the equipment responsible for generating a far-field noise may be identified. Also, the location on the watercraft 100 of a faulty component may be determined.

The component may be associated with the frequency of interest, and the presence of the fault may be indicated by the level or amplitude of the acoustic signals having the frequency of interest exceeding the predetermined threshold amplitude.

At step s520, using a determined physical location, an operator of the watercraft 100 may perform an action. For example, remedial action to repair or correct the faulty component located at the determined physical location may be taken, e.g., by an operator of the watercraft 100.

Advantageously, the speed by which an assessment may be made of the far-field radiated acoustic field can be used by engineers on the watercraft to find, understand, fix a fault, and to check the effectiveness of the repair.

Additional channels to the processor 124 may be provided to enable input of other sources of data from onboard the watercraft 100. Such other data may include, but is not limited to, data from accelerometers, microphones, and hydrophones. In some embodiments, this other sensor data may be used to improve, refine, or be correlated with the frequencies of predicted far-field radiated noise of the watercraft. In some embodiments, noise transmission mechanisms may be investigated by comparing the force and displacement outputs of shakers with the far-field noise.

Thus, the method 500 is provided.

The above-described method and apparatus advantageously tends to facilitate the prediction of the far-field radiated acoustic field in water of an object using near-field measurements. In particular, the above-described method and apparatus advantageously allows for the prediction of the far-field radiated acoustic field of an object, e.g., a submarine, when it is dived or submerged, for example at depths of greater or equal to 100 m. Moreover, the measurements used for the prediction can be performed while that object is surfaced, i.e., where at least portion of the object is above the surface or the water, or where a noise source of interest on the object is at or proximate to the surface. The prediction of the far-field radiated acoustic field tends to be faster, simpler, and/or more accurate than conventional methods and apparatuses.

Conventionally, far-field radiated noise fields of a dived submarine are predicted based on measurements of that submarine at depth, e.g., at depths of, but not limited to, about 100 m. This is because measurements near the surface, e.g., at depths of less than 100 m, tend to suffer significantly from the presence of the sea surface. There are two important propagation paths travelled along by the radiated noise to the acoustic sensors, namely the direct path and the surface-reflected path. The sea surface tends to or may be considered to act as a perfect reflector or a 'soft' reflector, which means sound waves tend to be reflected with a phase change of 180 degrees, i.e., out of phase with non-reflected sound waves. If the direct path and the surface-reflected path are of similar lengths, the two sounds arriving at the acoustic sensor will tend to cancel each other out at least to some extent. This type of interaction between two waves is known as destructive interference. In the context of multiple sources of sound, this is a well-known phenomenon referred to as Lloyd's Mirror. As such, conventional methods call for near-field measurements to be performed at dived or submerged depths (e.g., at depths of say, but not limited to, 100 m) for predictions of far-field radiated acoustic field predictions at depth. Moreover, large sets of sensors with a significant vertical extent, which reject sound from the surface reflected path, are used at more advanced ranges. These specialist sensors tend to be much more resource intensive than the common omnidirectional acoustic sensors.

As such, it is conventionally accepted that because measurements at around 100 m depth are compromised by the presence of the sea surface, measurements much closer to the surface would also be compromised to a similar if not greater extent. For example, measurements required to predict far-field acoustic fields are not performed at or proximate to the surface, e.g., at depths of less than 10 m.

The provided methods and apparatuses tend to account for, or at least not be significantly detrimentally affected by, unwanted reflections, for example from boundary surfaces, and/or other disturbances. For example, in the embodiments disclosed herein, the acoustic sensor will tend to predominately detect sound waves that have travelled directly from the noise source, even if the sound waves that have travelled directly from the noise source destructively interfered/cancelled with the sound waves that have travelled along the surface reflected path.

For example, in a setup with a 2 m separation between the noise source on the submarine and an acoustic sensor at a depth of 5 m, the ratio of path lengths can be roughly approximated to be (5+5)/2=5. The difference in the amplitudes of the signals due to attenuation from travelling in water (spreading loss) is about 20 log 10(5)=14 dB. This means the out-of-phase surface-reflected path signal is much smaller than the direct path signal and tends to have little effect on the direct path signal (<0.5 dB). This effect tends to be small compared to the propagation loss errors in conventional deep-water measurements. Additionally, there may be reflection losses at the surface and diffraction losses around the hull of the watercraft, e.g., a submarine, all of which reduce the signal from the surface reflection. The use of vector sensors may also reduce the signal from the surface reflection.

The above-described method and apparatus tends to be particularly advantageous in harbours or ports where acoustic sensors positioned along the harbour/port wall are in positions within the above-described ranges.

Advantageously, the above-described method and apparatus tend to provide good performance, regardless of the relative positions of source of the acoustic signals and the array. The predicted far-field patterns tend to provide good estimations of amplitude and amplitude change and also of azimuthal character.

The accuracy of the prediction of the far-field radiated acoustic field may be increased by taking a greater number of acoustic measurements, e.g., spatially, and using these measurements in the prediction. Accuracy may be further increased by measuring pressure and/or particle velocity, which may be referred to as vector sensor measurements or sound intensity measurements and using these measurements in the prediction.

Advantageously, the above-described method and apparatus tend to provide good predictions of the azimuthal pattern of the far-field radiated acoustic field.

Advantageously, the above-described method and apparatus tend to provide good performance across a wide range of acoustic sources, including, but not limited to, point sources, directional sources and evanescent sources. A typical evanescent source is flexural waves in a plate where the wave speed of the flexural waves is less than the speed of sound in the water. These have the property of generating sound in the near-field that does not tend to radiate to the far-field.

The above-described method and apparatus advantageously tend to facilitate the locating, and thus repair of, faults onboard watercraft. The above-described method and apparatus may be used to rapidly assess the effects of remedial actions taken in response to noise, shorts, component faults, or other problems. Operators may be provided with good estimates of the effectiveness of any remedial treatments carried out.

In the above embodiments, the watercraft is a submarine. The submarine has surfaced, i.e., at least a part of the submarine extends above the surface of the water. However, in other embodiments the submarine is entirely submerged. In some embodiments, the far-field radiated acoustic field of a different type of object, i.e., other than a submarine, is determined. Examples of appropriate objects include, but are not limited to, a different type of watercraft other than a submarine, such as a ship.

In the above embodiments, the measurement system comprises a single linear array of acoustic sensors. However, in other embodiments the measurement system additionally comprises one or more additional arrays (e.g., linear arrays) of acoustic sensors. The additional arrays may occupy different positions with respect to the watercraft. For example, in some embodiments, linear arrays of acoustic sensors are positioned at opposite sides of the watercraft, e.g., at the same depths as each other. In some embodiments, multiple linear arrays of acoustic sensors are positioned at different respective depths below the surface of the water.

In the above embodiments, pairs of adjacent acoustic sensors are attached together by respective couplings disposed therebetween. These coupling may be flexible or rigid. However, in other embodiments, one or more of the couplings may be omitted.

In the above embodiments, the array of acoustic sensors is submerged beneath the surface of the water such that it is alongside the watercraft, i.e., at the same depth as at least a part of the watercraft. For example, the array may be at the same depth as the longitudinal axis of the watercraft. However, in other embodiments, the array is not alongside the watercraft. For example, the array may be located deeper or shallower than all parts of the watercraft.

In the above embodiments, the array of acoustic sensors is located within the near-field of the watercraft, i.e., less than or equal to the Fraunhofer distance, $2D^2/\lambda$, from the watercraft, where D is the largest dimension of the watercraft (or part thereof) and $\lambda$ is the (minimum) wavelength of the signals produced by the watercraft. More preferably, the array is located less than or equal to $D^2/\lambda$ from the watercraft. More preferably, the array is located less than or equal to 2D from the watercraft. More preferably, the array is located less than or equal to 1.5D from the watercraft. More preferably, the array is located less than or equal to D from the watercraft. More preferably, the array is located less than or equal to D/2 from the watercraft.

In the above embodiments, the acoustic signals are transmitted in the water by or from the watercraft. These acoustic signals result from the operation of one or more component parts of the watercraft or may be generated by one or more vibration- or noise-producing devices in or on the watercraft. However, in other embodiments, an acoustic signal transmitter or array of transmitters is implemented. The acoustic signal transmitter or array of transmitters is remote from the watercraft. The acoustic signal transmitter or array of transmitters is configured to transmit acoustic signals into the water and onto the watercraft. The incident acoustic signals are reflected from the watercraft and subsequently measured by the array of acoustic sensors.

In the above embodiments, the array of acoustic sensors is fixed to a support structure that is remote from the watercraft. However, in other embodiments, the array of acoustic sensors is fixed or secured to the watercraft. By fixing or securing the array of acoustic sensors to the watercraft, maintaining the relative positions of the array of acoustic sensors and the watercraft tends to be facilitated.

Figure 15:
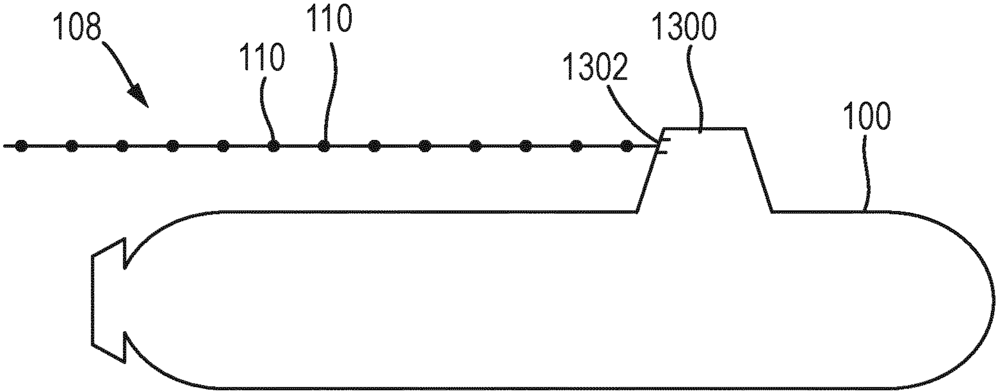
FIG. 15 is a schematic illustration (not to scale) depicting an array of acoustic sensors deployed from a watercraft.

In some embodiments, the array of acoustic sensors may be stored onboard the watercraft when not in use and deployed from the watercraft as needed. By way of example, the array of acoustic sensors may be deployed, extended, extruded, or unreeled through an aperture in an external skin of the watercraft into the water environment surrounding the watercraft. The array of acoustic sensors may be deployed while the watercraft is moving and/or while the watercraft is submerged, thereby to provide an "underway" assessment of its far-field radiated acoustic field. For example, as shown in FIG. 15, in embodiments in which the watercraft 100 is a submarine, the array 108 of acoustic sensors 110 may be deployed from a sail 1300 or a fin (e.g., a forward fin) of the submarine. The array 108 of acoustic sensors 110 may be deployed via a sealable aperture 1302 in an external surface of the sail 1300. The array 108 of acoustic sensors 110 may be pulled, e.g., reeled, back into the watercraft 100 after use.

Advantageously, deployment of the array of acoustic sensors from the watercraft tends to allow for measurement of the acoustic signature of the watercraft and prediction of its far-field radiated acoustic field to be performed wherever the watercraft is located. Furthermore, this tends to facilitate measurement of the acoustic signature of the watercraft and prediction of its far-field radiated acoustic field being performed at increased water depths, thereby to reduce surface scattering of the acoustic signals.

In the above embodiments, the object (i.e., the watercraft) is located in water. However, in other embodiments the object is a different type of object that is located in a different fluid, e.g., air. The object may be an aircraft. As such, the method may comprise providing a linear array of acoustic sensors, positioning the array of acoustic sensors in air proximate to the object to be measured (which may be an aircraft), radiating into the air, by the object, one or more acoustic signals, measuring, by the acoustic sensors, the acoustic signals, and predicting, by one or more processors operatively coupled to the array of acoustic sensors, the far-field radiated acoustic field of the object using the measurements of the acoustic signals. The array may be oriented in a direction that is substantially parallel to a longitudinal axis of the object. The array may be positioned in the near-field region of the object.

The invention claimed is:

1. A method of predicting a far-field radiated acoustic field of a submarine dived in water, the method comprising:

providing a linear array of acoustic sensors;

positioning the linear array of acoustic sensors in the water proximate to the submarine;

radiating into the water, by the submarine whilst the submarine is surfaced in the water such that at least a part of the submarine extends above a surface of the water and at least a part of the submarine extends below the surface of the water, one or more acoustic signals;

measuring, by the linear array of acoustic sensors, the acoustic signals; and predicting, by one or more processors operatively coupled to the linear array of acoustic sensors, the far-field radiated acoustic field of the submarine dived in the water using the measurements of the acoustic signals; wherein the positioning of the linear array of acoustic sensors comprises:

orienting a longitudinal axis of the linear array of acoustic sensors parallel to a longitudinal axis of the submarine; and positioning the linear array of acoustic sensors in a near-field region of the submarine, the near-field region of the submarine being a region that is less than or equal to a distance of $2D^2/\lambda$ from the submarine, where D is a length of the submarine or a part thereof along the longitudinal axis of the submarine and $\lambda$ is a wavelength of the one or more of the acoustic signals transmitted by the submarine.

2. The method of claim 1, wherein the positioning the linear array of acoustic sensors in the water comprises submerging the array in the water.

3. The method of claim 2, wherein a ratio between a length of a direct path from the linear array of acoustic sensors to a submerged part of the submarine and a length of a water surface-reflected path from the linear array of acoustic sensors to the submerged part of the submarine is less than or equal to 0.9.

4. The method of claim 3, wherein the ratio is less than or equal to 0.5.

5. The method of claim 1, wherein the linear array of acoustic sensors is a uniform linear array of acoustic sensors.

6. The method of claim 1, wherein a spacing between pairs of adjacent acoustic sensors in the linear array of acoustic sensors is less than or equal to half of $\lambda$.

7. The method of claim 1, further comprising fixing the linear array of acoustic sensors to a support structure.

8. The method of claim 7, wherein the support structure is a support structure selected from a group of support structures consisting of a support structure that is at least partially submerged in the water, a support structure that is remote from the water, a buoyant support structure floating on the water, a harbour wall, a dock wall, a wall of a shipyard, a wall of a submarine pen, a jetty, an oil rig, a watercraft, scaffolding, a pontoon, a raft, a buoy.

9. The method of claim 1, wherein the linear array of acoustic sensors comprises couplings attaching together pairs of adjacent acoustic sensors, and, optionally, either the couplings are flexible thereby to allow for winding of the array onto a reel, or the couplings are rigid.

10. The method of claim 1, wherein the dived submarine is a submarine at a depth of greater than or equal to 100 m.

11. The method of claim 1, wherein the positioning of the linear array of acoustic sensors comprises positioning the linear array of acoustic sensors at a same depth beneath a surface of the water as at least a part of the submarine.

12. The method of claim 1, wherein the predicting of the far-field radiated acoustic field comprises calculating a Kirchhoff-Helmholtz integral multiplied by a multiplicative scaling factor.

13. The method of claim 1, further comprising:

identifying a frequency of interest in the predicted far-field radiated acoustic field; and using the linear array of acoustic sensors, determining a location on the submarine of a source of a signal having the frequency of interest.

14. The method of claim 13, wherein the determining the location comprises performing near-field beam steering using the linear array of acoustic sensors.

15. The method of claim 13, wherein the frequency of interest is associated with a fault, and the method further comprises performing a remedial action to repair the fault.

16. The method of claim 1, wherein:

the method further comprises:

positioning one or more further linear arrays of further acoustic sensors in the water proximate to the submarine; and measuring, by the further acoustic sensors, the acoustic signals; wherein the predicting of the far-field radiated acoustic field of the submarine further uses the measurements of the acoustic signals taken by the further acoustic sensors.

17. An apparatus for predicting a far-field radiated acoustic field of a submarine dived in water, the apparatus comprising:

a linear array of acoustic sensors, the linear array of acoustic sensors being configured to measure acoustic signals in the water radiated by the submarine when the submarine is surfaced such that at least a part of the submarine extends above a surface of the water and at least a part of the submarine extends below the surface of the water; and one or more processors operatively coupled to the linear array of acoustic sensors, the one or more processors being configured to predict the far-field radiated acoustic field of the submarine dived in the water using the measurements taken by the linear array of acoustic sensors.

18. The apparatus of claim 17, wherein the linear array of acoustic sensors is a uniform linear array of acoustic sensors.

19. The apparatus of claim 17, wherein spacing between pairs of adjacent acoustic sensors in the linear array of acoustic sensors is less than or equal to half of $\lambda$, where $\lambda$ is a wavelength of one or more of the acoustic signals.

20. The apparatus of claim 17, further comprising a support structure, wherein the linear array of acoustic sensors is fixed to the support structure.

* * * * *